United States Patent
Allen et al.

(10) Patent No.: US 10,997,214 B2
(45) Date of Patent: *May 4, 2021

(54) USER INTERACTION DURING GROUND TRUTH CURATION IN A COGNITIVE SYSTEM

(71) Applicant: INTERNATIONAL BUSINESS MACHINES CORPORATION, Armonk, NY (US)

(72) Inventors: Corville O. Allen, Morrisville, NC (US); Andrew R. Freed, Cary, NC (US); Sorabh Murgai, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 360 days.

This patent is subject to a terminal disclaimer.

(21) Appl. No.: 15/843,510

(22) Filed: Dec. 15, 2017

(65) Prior Publication Data

US 2019/0050474 A1 Feb. 14, 2019

Related U.S. Application Data

(63) Continuation of application No. 15/671,201, filed on Aug. 8, 2017, now Pat. No. 10,599,682.

(51) Int. Cl.
*G06F 17/30* (2006.01)
*G06F 16/28* (2019.01)
(Continued)

(52) U.S. Cl.
CPC ......... *G06F 16/285* (2019.01); *G06K 9/6253* (2013.01); *G06K 9/6263* (2013.01);
(Continued)

(58) Field of Classification Search
None
See application file for complete search history.

(56) References Cited

U.S. PATENT DOCUMENTS 7,558,766 B1 * 7/2009 Forman ............... G06K 9/6231
706/20
8,107,726 B2 1/2012 Xu et al.
(Continued)

OTHER PUBLICATIONS

Burke, "Gamify: How Gamification Motivates People to Do Extraordinary Things", Gartner, Inc., Apr. 8, 2014, 15 Pages, Bibliomotion, Inc., Brookline, MA, ISBN 978-1-937134-85-3.
(Continued)

*Primary Examiner* — Hung D Le
(74) *Attorney, Agent, or Firm* — Anthony M. Pallone

(57) ABSTRACT

An embodiment of the invention may include a method, computer program product, and system for generating ground truth data for a plurality of cognitive capabilities within an overall cognitive system. The embodiment may include configuring multiple sets of training data. Each set of training data corresponds to a separate cognitive capability. The embodiment may include displaying a set of ground truth curation activities via a user interface. The embodiment may include determining the ground truth curation activities performed for a first type of data for a first duration. The first type of data is selected from the single set of grouped training data. The embodiment may include determining whether the first duration has exceeded a predetermined threshold. The embodiment may include switching the curation activities to a second type of data. The second type of data is selected from the single set of grouped data.

7 Claims, 5 Drawing Sheets

(51) Int. Cl.
  *G06N 5/00* (2006.01)
  *G06N 20/00* (2019.01)
  *G06K 9/62* (2006.01)
  *G06F 40/211* (2020.01)

(52) U.S. Cl.
  CPC ............ *G06N 5/006* (2013.01); *G06N 20/00* (2019.01); *G06F 40/211* (2020.01); *G06K 9/6224* (2013.01)

(56) References Cited

U.S. PATENT DOCUMENTS

| | | | |
|---|---|---|---|
| 8,269,849 | B2 | 9/2012 | Simske et al. |
| 8,510,283 | B2* | 8/2013 | Hull .................. G06K 9/00463 707/706 |
| 9,443,168 | B1 | 9/2016 | Musial et al. |
| 10,318,757 | B1 | 6/2019 | Kenthapadi et al. |
| 2014/0220514 | A1* | 8/2014 | Waldron ............... A63F 13/005 434/107 |
| 2014/0249447 | A1 | 9/2014 | Sereno |
| 2016/0048542 | A1 | 2/2016 | Gluzman Peregrine |
| 2016/0078359 | A1 | 3/2016 | Csurka |
| 2016/0098645 | A1 | 4/2016 | Sharma |
| 2016/0140451 | A1* | 5/2016 | Li ........................ G06N 20/00 706/12 |
| 2016/0170967 | A1* | 6/2016 | Allen ..................... G10L 25/63 704/9 |
| 2016/0203523 | A1 | 7/2016 | Spasojevic et al. |
| 2016/0217389 | A1 | 7/2016 | Cordes et al. |
| 2016/0262612 | A1 | 9/2016 | Klin |
| 2017/0169017 | A1* | 6/2017 | Byron .................... G06F 16/35 |
| 2018/0286272 | A1 | 10/2018 | McDermott |
| 2020/0125921 | A1 | 4/2020 | Manico et al. |

OTHER PUBLICATIONS

Flatla, et al., "Calibration Games: Making Calibration Tasks Enjoyable by Adding Motivating Game Elements", UIST'11, Oct. 16-19, 2011, 10 Pages, Copyright 2011, ACM 978-1-4503-0716-1/11/10, Santa Barbara, CA, USA.

Mell et al., "The NIST Definition of Cloud Computing", NIST, Sep. 2011, pp. 1-3, Special Publication 800-145, U.S. Department of Commerce, Gaithersburg, MD.

IBM, List of IBM Patents or Patent Applications Treated as Related, Appendix P, dated Dec. 21, 2017, 2 pages.

Pending U.S. Appl. No. 15/671,201, filed Aug. 8, 2017, entitled: "User Interaction During Ground Truth Curation in a Cognitive System", 29 pages.

\* cited by examiner

US 10,997,214 B2

USER INTERACTION DURING GROUND TRUTH CURATION IN A COGNITIVE SYSTEM

BACKGROUND

The present invention relates to a system for training cognitive capabilities within a cognitive solution, and more specifically, to providing for effective classification of contextually related data for the cognitive solution.

Ground truth is a term used in various fields to refer to information provided by direct observation. In machine learning, the term ground truth refers to the accuracy of the training data set's classification for supervised learning techniques. It involves a user that tells the machine learning algorithm what to lean. The user labels the training data examples to be classified by the machine learning algorithm. A trained machine learning model will be limited by the accuracy of the ground truth data used for training.

BRIEF SUMMARY

An embodiment of the invention may include a method, computer program product, and system for generating ground truth data for a plurality of cognitive capabilities within an overall cognitive system. The embodiment may include configuring multiple sets of training data. Each set of training data corresponds to a separate cognitive capability within the overall cognitive system. The embodiment may include displaying a set of ground truth curation activities via a user interface. The set of ground truth curation activities includes classifying training datum from a single set of grouped training data. The embodiment may include determining the ground truth curation activities performed for a first type of data for a first duration. The first type of data is selected from the single set of grouped training data and the first duration is pre-determined. The embodiment may include determining whether the first duration has exceeded a pre-determined threshold. Based on determining that the first duration has exceeded the pre-determined threshold, the embodiment may include switching the curation activities to a second type of data. The second type of data is selected from the single set of grouped data.

DETAILED DESCRIPTION

Figure 1:
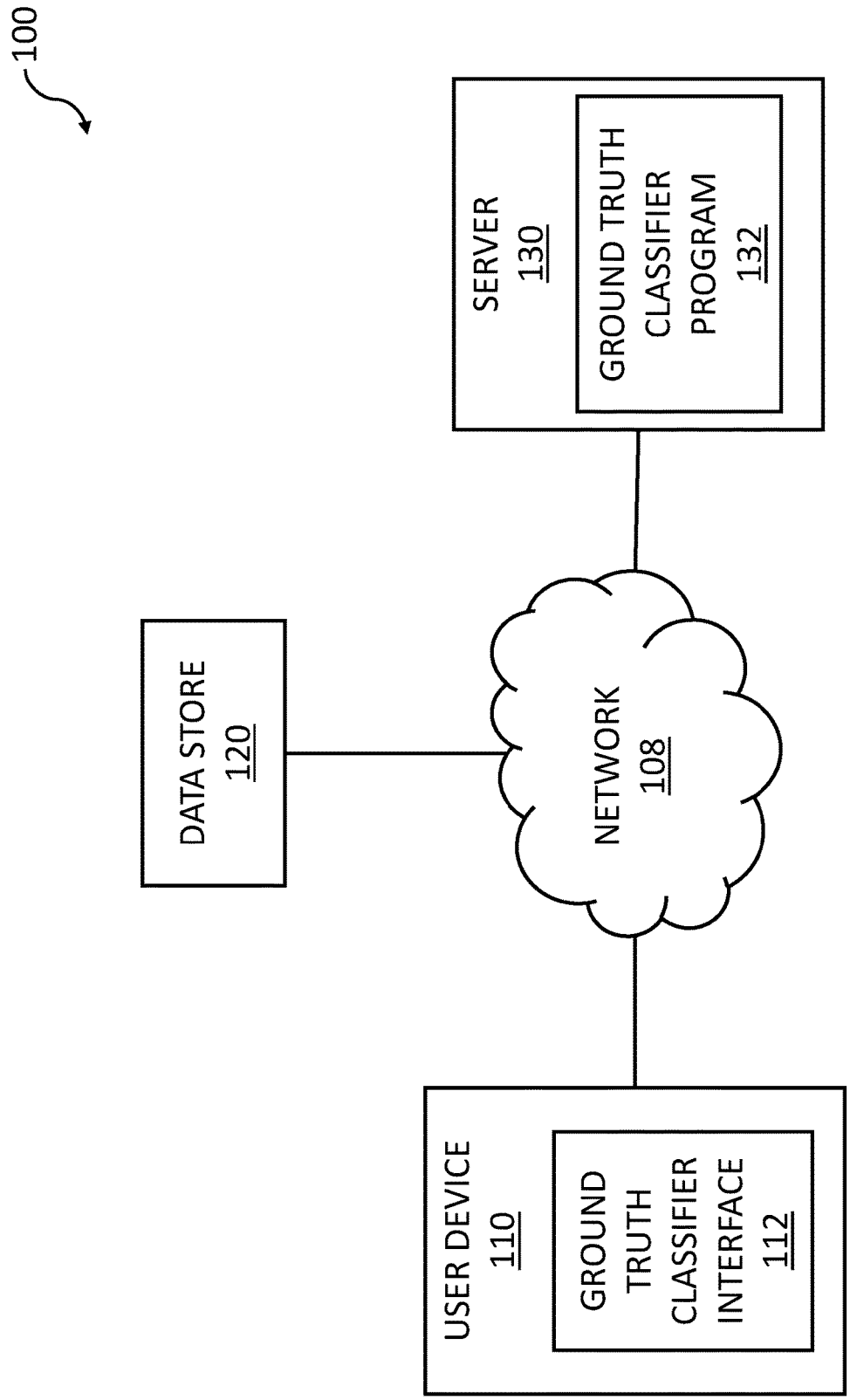
FIG. 1 is a block diagram illustrating a ground truth classification system, in accordance with an embodiment of the present invention.

In a cognitive system, there may be two or more cognitive capabilities that come together to interact within the overall cognitive system. For example, a set of cognitive capabilities within a cognitive system may include image recognition, a speech to text service, text/intent classification, and named entity recognition. The functionality of each cognitive capability is based on ground truth data that is applicable in the context of the overall cognitive system, as well as the individual cognitive capability. For example, a cognitive capability may, in the course of its operation, utilize ground truth data to classify newly encountered data. Furthermore, ground truth data for the cognitive capability may be generated through classification of an initial training data set. The process of classifying an initial training data set, which constitutes the ground truth data for a cognitive capability, is known as ground truth curation. Each cognitive capability requires ground truth curation which may involve a tedious set of time consuming activities, performed by a user, which may not be effective when performed alone and separate from the context of ground truth curation for the other cognitive capabilities within the overall cognitive system.

Embodiments of the present invention make ground truth curation for multiple cognitive capabilities interactive with the user and thus more effective within the context of the overall cognitive system being created. Most existing methods for ground truth curation focus on activities which classify one type of ground truth data, for one corresponding cognitive capability, at a time. However, the repetitiveness of such ground truth curation activities may be reduced by presenting an interface which switches ground truth curation activities between different, but related within the context of the overall cognitive system, types of ground truth data corresponding to different cognitive capabilities. Presenting an interface which switches between related ground truth data sets during the curation process may improve training stage interaction between the user and the cognitive system by reducing mental fatigue of the user and by producing more accurate training results.

Embodiments of the present invention may include a ground truth classification system 100, described below, which provides a method for classifying multiple types of ground truth data at a time to keep the user engaged and increase the user's performance level. Ground truth classification system 100 takes a set of training data, which targets training a cognitive capability within an overall cognitive system and serves as ground truth data for that cognitive capability, and correlates the set of training data to other set(s) of training data, where each set of training data targets training a different cognitive capability within an overall cognitive system. Ground truth classification system 100 may correlate sets of training data based on a relationship and likeliness of use, either through proximal use or contextual use, of the corresponding cognitive capabilities within the context of the overall cognitive system. For example, in a cognitive poker application where the classification being performed is "check" in the context of a betting phase, utilization of an image recognition capability may be contextually related to utilization of a text recognition capability. Consequently, a set of training data containing images (for training the image recognition capability) of hands and the table that represent "check" may be correlated to a set of training data containing text (for training the text recognition capability) that represents "check" (e.g. "check", "stay", "I'm good"). Furthermore, in embodiments of the present invention, ground truth classification system 100 may then display a user interface with multiple tabs. Each tab of the user interface leads the user to a set of ground truth curation activities for different, but related, cognitive capabilities within the cognitive system. Ground truth classification system 100 may track the ground truth currently being curated and the time spent by the user in performing the curation activities. After a pre-determined duration of time, ground truth classification system 100 may prompt the user to switch to a related set of ground truth curation activities for a subsequent duration of time. Embodiments of the present invention continue to switch between related sets of ground truth curation activities continues until all ground truth data for the cognitive system is classified.

Embodiments of the present invention will now be described in detail with reference to the accompanying Figures.

FIG. 1 is a functional block diagram illustrating ground truth classification system 100, in accordance with an embodiment of the present invention. In an example embodiment, ground truth classification system 100 may include network 108, user device 110, data store 120, and server 130.

In various embodiments, network 108 is a communication channel capable of transferring data between connected devices. In an example embodiment, network 108 may be the Internet, representing a worldwide collection of networks and gateways to support communications between devices connected to the Internet. Moreover, network 108 may include, for example, wired, wireless, or fiber optic connections which may be implemented as an intranet network, a local area network (LAN), a wide area network (WAN), or any combination thereof. In further embodiments, network 108 may be a Bluetooth network, a WiFi network, or a combination thereof. In general, network 108 can be any combination of connections and protocols that will support communications between user device 110, data store 120, and server 130.

In an example embodiment, user device 110 includes ground truth classifier interface 112. User device 110 may be a laptop computer, a notebook, a tablet computer, a netbook computer, a personal computer (PC), a desktop computer, a personal digital assistant (PDA), a smart phone, a mobile phone, a virtual device, a thin client, or any other electronic device or computing system capable of receiving and sending data to and from other computing devices such as server 130, via network 108, and capable of supporting the functionality required of embodiments of the invention. While user device 110 is shown as a single device, in other embodiments, user device 110 may be comprised of a cluster or plurality of computing devices, working together or working separately. User device 110 may be described generally with respect to FIG. 3 below.

In an example embodiment, ground truth classifier interface 112 may be a program, or subroutine contained in a program, that may allow a user of user device 110 to interact with user device 110 as well as other connected devices via network 108. In addition, ground truth classifier interface 112 may be connectively coupled to hardware components, such as those depicted by FIG. 3, for receiving user input, including mice, keyboards, touchscreens, microphones, cameras, and the like. In an example embodiment, ground truth classifier interface 112 is implemented via a web browsing application containing a graphical user interface (GUI) and display that is capable of transferring data files, folders, audio, video, hyperlinks, compressed data, and other forms of data transfer individually or in bulk. In other embodiments, user interface 112 may be implemented via other integrated or standalone software applications and hardware capable of receiving user interaction and communicating with other electronic devices. In an example embodiment, ground truth classifier interface 112 may send and receive data to and from ground truth classifier program 132, via network 108. In addition, ground truth classifier interface 112 may display various types of ground truth classification activities to be performed by a user of user device 110. In an example embodiment, ground truth classifier interface 112 may receive, from a user, a classification for a training datum and transmit, via network 108, the classification to ground truth classifier program 132.

In an example embodiment, data store 120 may be a laptop computer, tablet computer, netbook computer, personal computer (PC), desktop computer, a networked computer appliance, or any other networked programmable electronic device capable of storing data and capable of an exchange of data with other electronic devices, for example, through a network adapter, in accordance with an embodiment of the invention. In an example embodiment, data store 120 may store multiple sets of unclassified training data corresponding to, and used to train, separate cognitive capabilities within a cognitive system. The sets of training data stored within data store 120 may result from datamining or be provided by a ground truth classification system administrator. In an example embodiment, the data stored in data store 120 may be structured (i.e. have associated metadata), partially structured, or unstructured. Moreover, the data within data store 120 may be written in programming languages of common file formats such as .docx, .doc, .pdf, .rtf, .mp3, .wma, .m4p, .wav, .jpg, .tif, .gif, .bmp, etc. In an example embodiment, data store 120 may contain sets of training data in relation to cognitive capabilities such as image recognition, audio recognition, and text analytics. Data store 120 may be described generally with respect to FIG. 3 below. In another embodiment, data store 120 may be located in server 130.

In an example embodiment, server 130 may include ground truth classifier program 132. Server 130 may be a desktop computer, a notebook, a laptop computer, a networked computer appliance, or any other networked electronic device or computing system capable of sending and receiving data to and from other computing devices such as user device 110 and data store 120, via network 108. While server 130 is shown as a single device, in other embodiments, server 130 may be comprised of a cluster or plurality of computing devices, working together or working separately. Server 130 may be described generally with respect to FIG. 3 below.

Ground truth classifier program 132 facilitates the classification of training data for multiple cognitive capabilities within an overall cognitive system in accordance with embodiments of the ground truth classification system of FIG. 1. In an example embodiment, ground truth classifier program 132 may be a software application or configuration in a software application capable of retrieving, from data store 120 via network 108, unclassified training data sets which may serve as the ground truth data for multiple cognitive capabilities within a cognitive system. In an example embodiment, ground truth classifier program 132 may then determine a correlation between the retrieved sets of unclassified training data, where each set of training data is used to train a separate cognitive capability within the context of an overall cognitive system. The determined correlations are based on a likeliness of use of the separate cognitive capabilities within the overall cognitive system, either by proximal or contextual system use. Proximal use may exist where two cognitive capabilities are performed together in relation to the overall cognitive system as indicated by system logs or as indicated from a temporal perspective. Contextual use may exist where two cognitive capabilities contextually supplement each other within the use of a feature or capability of the overall cognitive system. Based on the determined correlations, ground truth classifier program 132 may also determine the sets of unclassified training data to be displayed and classified via ground truth classifier interface 112. Furthermore, in an example embodiment, ground truth classifier program 132 may track the classification activities of a user utilizing ground truth classifier interface 112 to classify a current set of training data and limit, to a threshold amount, the duration spent by the user in classifying the current set of training data. Once the threshold duration has been exceeded, ground truth classifier program 132 may switch the classification activity of the user to another, correlated, set of training data. Ground truth classifier program 132 may continue to switch the classification activities of the user until the retrieved sets of training data have been classified. In an example embodiment, ground truth classifier program 132 may also transmit, via network 108, the classified sets of training data, which serve as ground truth data for multiple cognitive capabilities within an overall cognitive system, to data store 120. The operations and functions of ground truth classifier program 132 are described in further detail below with regard to FIG. 2.

Figure 2:
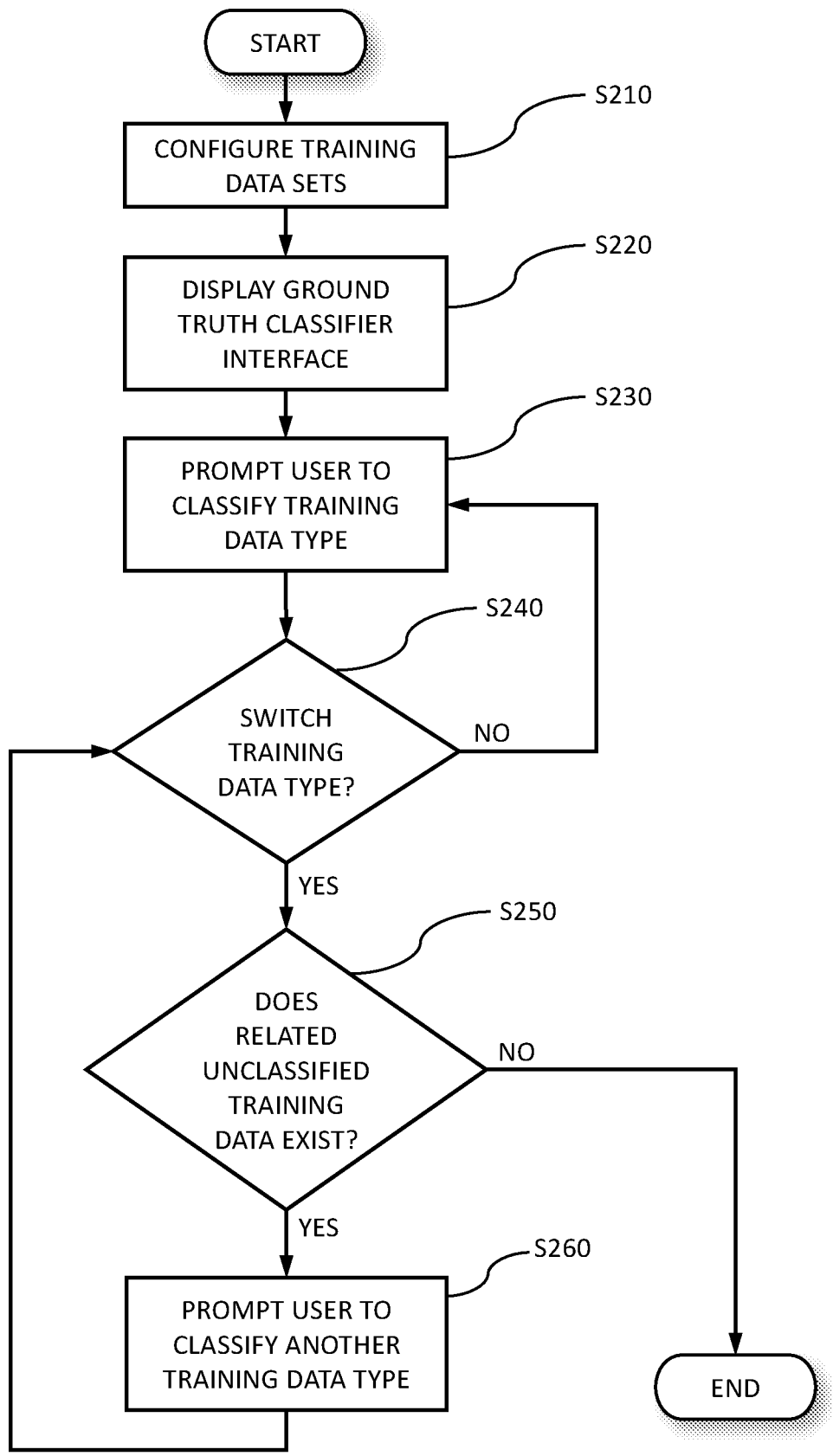
FIG. 2 is a flowchart illustrating the operations of the ground truth classifier program of FIG. 1, in accordance with an embodiment of the invention.

FIG. 2 shows a flowchart illustrating the operations of ground truth classifier program 132 in accordance with an example embodiment of the invention. Referring to step S210, ground truth classifier program 132 may retrieve, via network 108, and configure multiple sets of training data stored in data store 120. Each set of training data may serve as ground truth data to train separate cognitive capabilities within an overall cognitive system. In configuring the multiple sets of training data, ground truth classifier program 132 may correlate a set of training data to another set of training data with a relationship and likeliness of use within the context of the overall cognitive system. In an example embodiment, ground truth classifier program 132 may generate a correlation and relationship score for each training datum. The correlation and relationship score may be based on domain level expertise gleaned from discussions between a developer and a subject matter expert which identify required features of the cognitive system and a set of contexts for the domain. In an example embodiment, where the cognitive system is in the poker domain, features of the cognitive system may be, for example, the numerical value of a card, the hand gesture for fold, and the word "fold" or "bet". Furthermore, the context may be, for example, "the betting stage", "dealing", "hand state", "folding", "hand strength", "misdeal", and "check".

Referring to step S220, ground truth classifier program 132 may group segments of closely related training data sets into a single set for classification via ground truth classifier interface 112. In an example embodiment, ground truth classifier program 132 may determine the curation tabs to be displayed within ground truth classifier interface 112, based on the segments of closely related training data sets that were grouped together. Each tab displayed within ground truth classifier interface 112 may correspond to the type of ground truth curation activity (i.e. classification of a training datum from a training data set) to be performed by the user. For example, sets of training data may include a set of 500 training data entries for conversational text and a set of 800 training data entries for images. Ground truth classifier program 132 may determine, through correlation and relationship scores, that a segment of 200 images are more closely related to a segment of 200 conversational texts. Ground truth classifier program 132 may then group the segments of images and conversational texts together for classification via ground truth classifier interface 112. Furthermore, in an example embodiment, ground truth classifier program 132 may direct ground truth classifier program 112 to display a tab for ground truth curation activities for images and a tab for ground truth curation activities for conversational texts.

Referring to step S230, ground truth classifier program 132 may prompt, via ground truth classifier interface 112, the user for which type of curation activity (e.g. classification of images or classification of conversational texts) they would like to start with. Once selected, ground truth classifier program 132 provides the user, via ground truth classifier interface 112, with classification choices for every training datum presented to the user. In an example embodiment, where the cognitive system is in the poker domain, the context may be "betting phase" and the classification may be "check", if the user selects curation activities for images, the user is presented with images of hands and the table that represent "check". For each imaged presented, the user may select the classification which best describes the presently displayed image (e.g. "first knock", "two finger tap", "palm single tap").

Referring to step S240, ground truth classifier program 132 may track the type of ground truth currently being curated, the time spent curating the current type of ground truth, and the other related types of ground truth grouped in step S220. Ground truth classifier program 132 may automatically switch the type of curation activity to be performed by the user. In an example embodiment, the determination to switch the type of curation activity may be based on a single factor, such as the duration of time spent performing a given type of curation activity. In another embodiment, the determination to switch the type of curation activity may be based on the time spent performing a given type of curation activity, the number of training data entries classified, the average time for a classification, the frequency of selection of a given classification type exceeding a threshold, or any combination thereof. For example, once the user has classified 100 images, ground truth classifier program 132 may switch the curation activity to conversational texts. In another embodiment, curation activity switching may occur for a single interaction, rather than at the batch level. In an example embodiment, if the time spent performing a given type of curation activity exceeds a pre-determined threshold, ground truth classifier program 132 proceeds to step S250. If the time spent performing a given type of curation activity does not exceed the pre-determined threshold, ground truth classifier program 132 proceeds to step S230. In an example embodiment, ground truth classifier program 132 continues to switch between curation activities until all of the training data grouped in step S220 is classified. In an example embodiment, ground truth classifier program 132 may determine that the time spent by the user classifying images of "check", within the poker domain, has exceeded some threshold duration and proceeds to step S250.

Referring to step S250, ground truth classifier program 132 may determine if all of the training data grouped in step S220 has been classified. If related unclassified training data exists, ground truth classifier program 132 proceeds to step S260. If related unclassified training data does not exist, then the user has classified all the training data grouped in step S220 and no further curation activity is required. In an example embodiment, ground truth classifier program 132 determines that related unclassified training data exists and proceeds to step S260.

Referring to step S260, ground truth classifier program 132 may switch the curation activity of the user by prompting the user, via ground truth classifier interface 112, to begin classification of a different training data type, from the group created in step S220, for a subsequent duration of time. The different training data types grouped together in step S220 may train separate, but related, cognitive capabilities within the context of the overall cognitive system. In an example embodiment, ground truth classifier program 132 may prompt, via ground truth classifier interface 112, the user to begin classification of conversational texts in the context of "check" within the poker domain. The user may then be presented with conversational texts that represent "check". Examples of such texts may include "check", "stay", "stand", "I'm good", "I'm staying, and "let them be".

Figure 3:
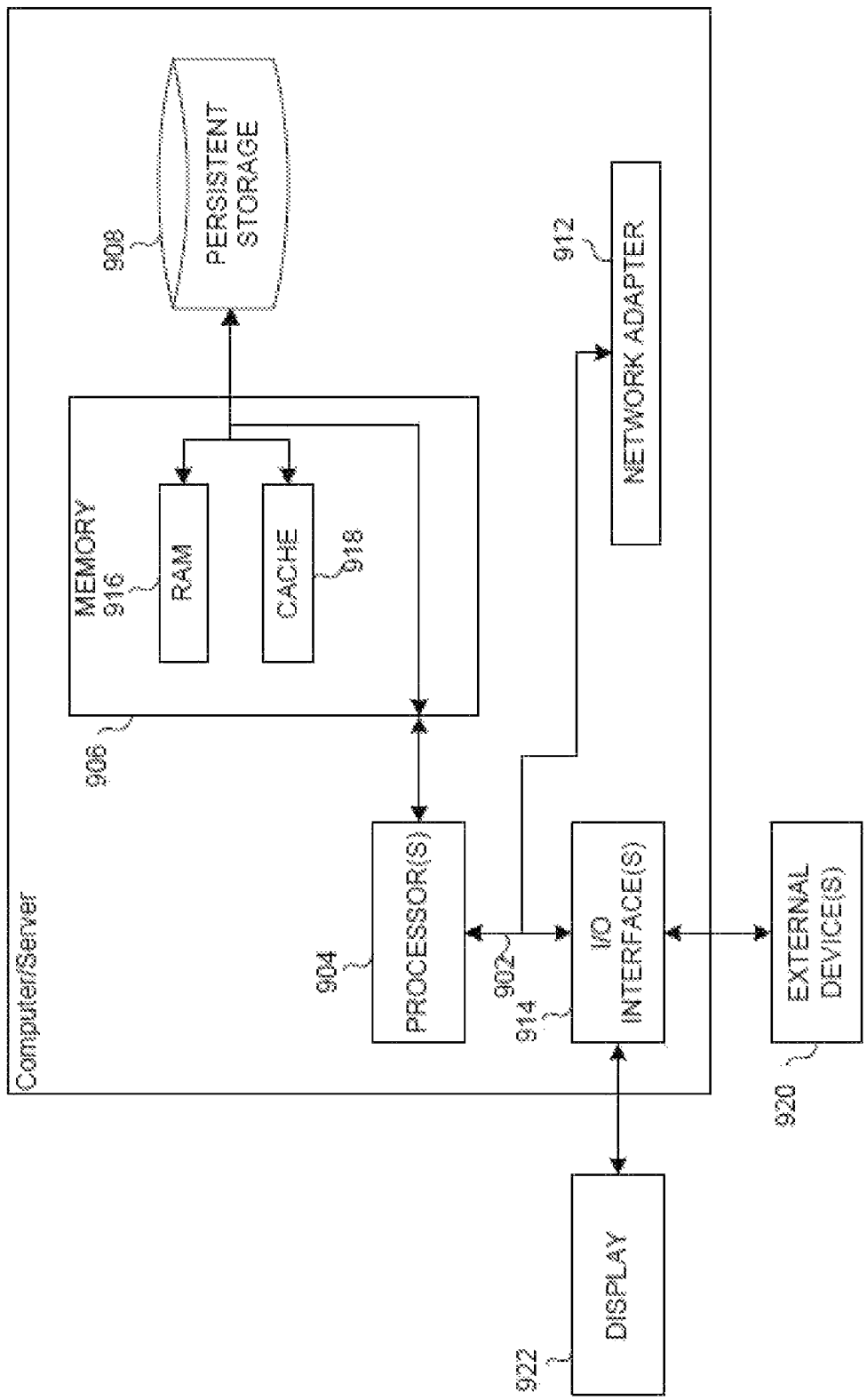
FIG. 3 is a block diagram depicting the hardware components of the ground truth classification system of FIG. 1, in accordance with an embodiment of the invention.

FIG. 3 depicts a block diagram of components of user device 110, data store 120, and server 130, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

User device 110, data store 120, and server 130 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs ground truth classifier interface 112 in user device 110; and ground truth classifier program in server 130 are stored in persistent storage 908 for execution by one or more of the respective computer processors 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs ground truth classifier interface 112 in user device 110; and ground truth classifier program in server 130 may be downloaded to persistent storage 908 through network adapter 912.

I/O interface(s) 914 allows for input and output of data with other devices that may be connected to user device 110, data store 120, and server 130. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs ground truth classifier interface 112 in user device 110; and ground truth classifier program in server 130, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
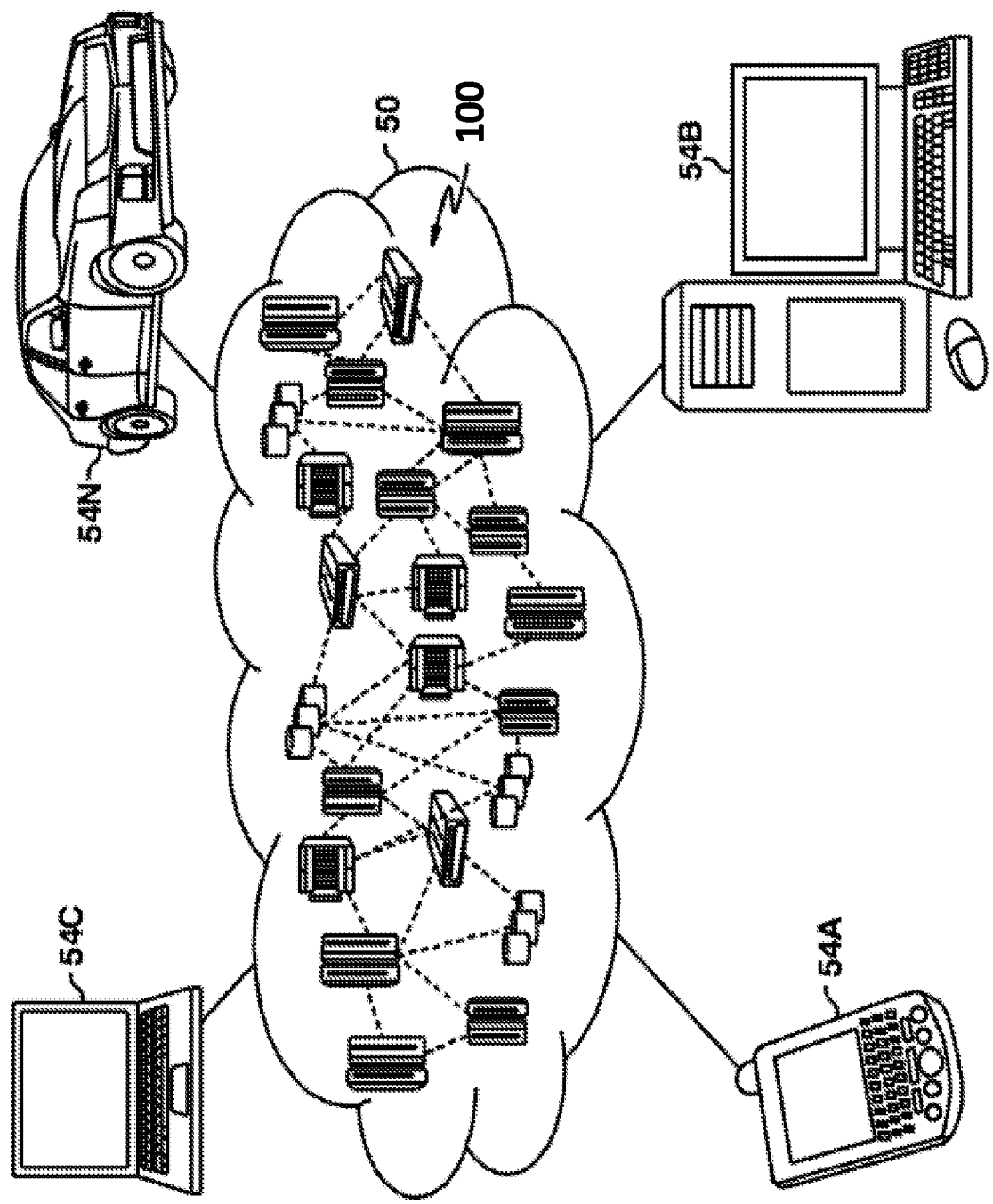
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
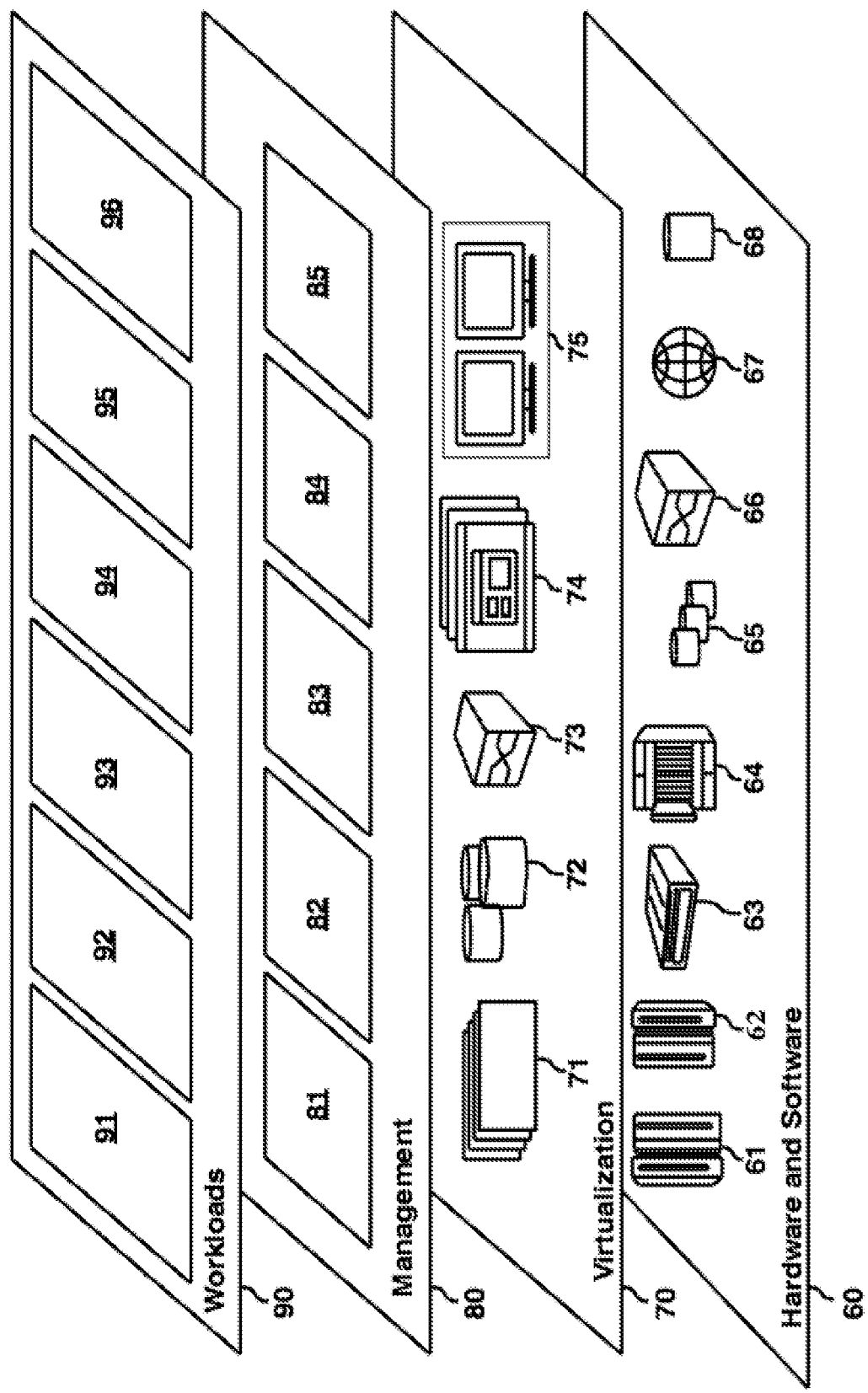
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and bot/mailing list detection system 96. Ground truth classification system 96 may relate to classification of training data for multiple cognitive capabilities within an overall cognitive system.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for generating ground truth data for a plurality of cognitive capabilities within an overall cognitive system, the method comprising:
    configuring multiple sets of training data, wherein each set of training data corresponds to a separate cognitive capability within the overall cognitive system;
    determining a set of ground truth curation activity performed, by a user, for a first type of data for a first duration, wherein a ground truth curation activity comprises classification, by the user, of one or more training datum within a training data set, and wherein the first type of data is selected from a single set of grouped training data, and wherein the first duration is pre-determined
    displaying the set of ground truth curation activity for the first type of data via a user interface;
    determining whether the first duration has exceeded a pre-determined threshold; and
    based on determining that the first duration has exceeded the pre-determined threshold, switching from the set of ground truth curation activity for the first type of data to a set of ground truth curation activity for a second type of data, wherein the second type of data is selected from the single set of grouped data.

2. The method of claim 1, wherein configuring the multiple sets of training data comprises correlating the multiple sets of training data to each other based on a likeliness of use of the corresponding separate cognitive capabilities within the overall cognitive system.

3. The method of claim 2, wherein the likeliness of use of the corresponding separate cognitive capabilities within the overall cognitive system comprises:
    determining whether a proximal use exists, wherein proximal use exists when the separate corresponding cognitive capabilities occur together from a temporal perspective; and
    determining whether a contextual use exists, wherein contextual use exists where the separate corresponding cognitive capabilities contextually supplement each other within the use of the overall cognitive system.

4. The method of claim 2, further comprising:
    generating a correlation score for each training datum within the multiple sets of training data based on the likeliness of use of the corresponding separate cognitive capability within the overall cognitive system.

5. The method of claim 4, further comprising:
    grouping training datum from the multiple sets of training data into the single set of grouped training data based on the correlation score generated for each training datum, wherein the correlation score generated for each training datum exceeds a pre-determined threshold value, and wherein the single set of grouped training data comprises more than one type of data.

6. The method of claim 5, wherein the user interface displays a labeled tab corresponding to each type of the more than one type of data within the single set of grouped training data, and wherein each of the labeled tabs leads to curation activity for the corresponding type of data.

7. The method of claim 1, wherein the first type of data is used for training a first cognitive capability, and wherein the second type of data is used for training a second cognitive capability, and wherein the first type of data and the second type of data are contextually related.

* * * * *